June 19, 1951     W. M. POWELL     2,557,761
FLUX PHASE INDICATOR

Filed April 28, 1950     2 Sheets-Sheet 1

INVENTOR.
WILSON M. POWELL
BY
Roland A. Anderson
ATTORNEY.

June 19, 1951     W. M. POWELL     2,557,761
FLUX PHASE INDICATOR

Filed April 28, 1950            2 Sheets-Sheet 2

INVENTOR.
WILSON M. POWELL
BY
*Roland A. Anderson*
ATTORNEY.

Patented June 19, 1951

2,557,761

UNITED STATES PATENT OFFICE 2,557,761

FLUX PHASE INDICATOR

Wilson M. Powell, Berkeley, Calif., assignor to the United States of America as represented by the United States Atomic Energy Commission Application April 28, 1950, Serial No. 158,833

6 Claims. (Cl. 175—183)

1

The present invention relates to the measurement of magnetic fields and more particularly to the measurement of the phase difference between the magnetic flux at separate points in a magnetic field of varying intensity.

An object of this invention is to provide a system which will graphically depict the magnetic flux phase difference between points in a varying magnetic field.

Another object of the invention is to provide apparatus which will produce a plot of the variations in the instantaneous magnetic flux intensity of the points on a predetermined path in a varying magnetic field with reference to that instantaneous flux intensity at a reference point in the magnetic field.

A further object of the invention is to provide a system which will indicate the magnetic flux phase difference between points in an alternating magnetic field.

Other objects and advantages of the invention will become apparent from the following specification taken in conjunction with the accompanying drawings, wherein.

Figure 1:
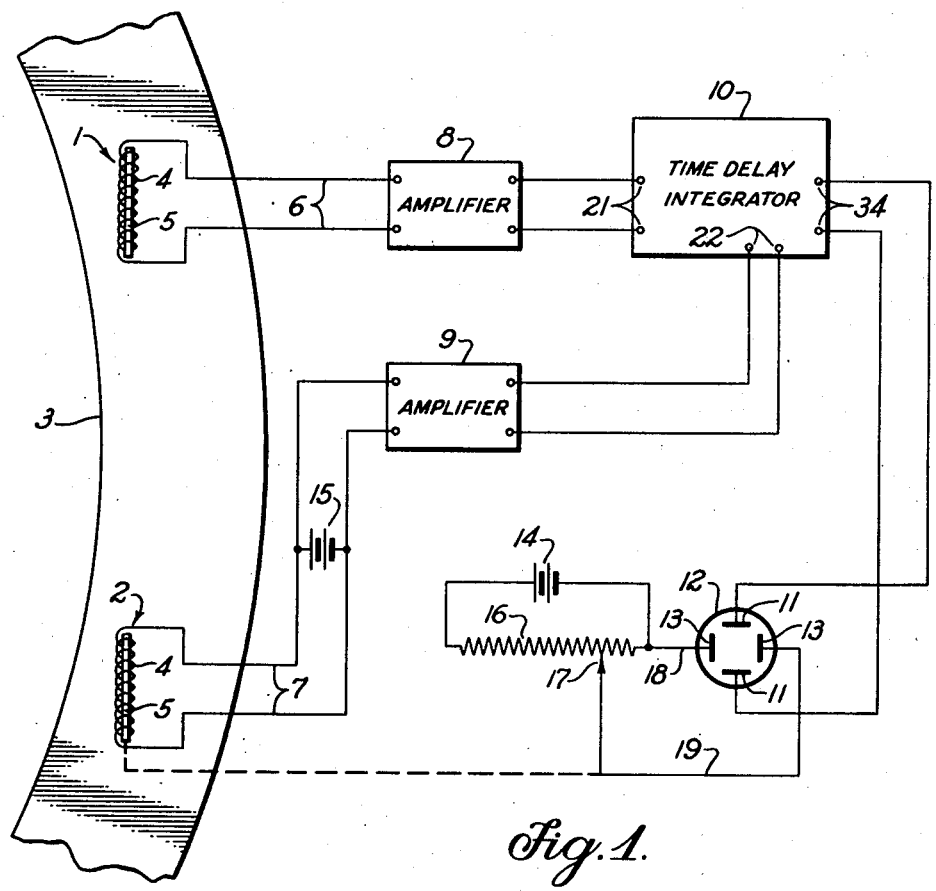
Figure 1 is a schematic representation of one embodiment of the invention showing the electrical components and connections thereof.
Figure 3:
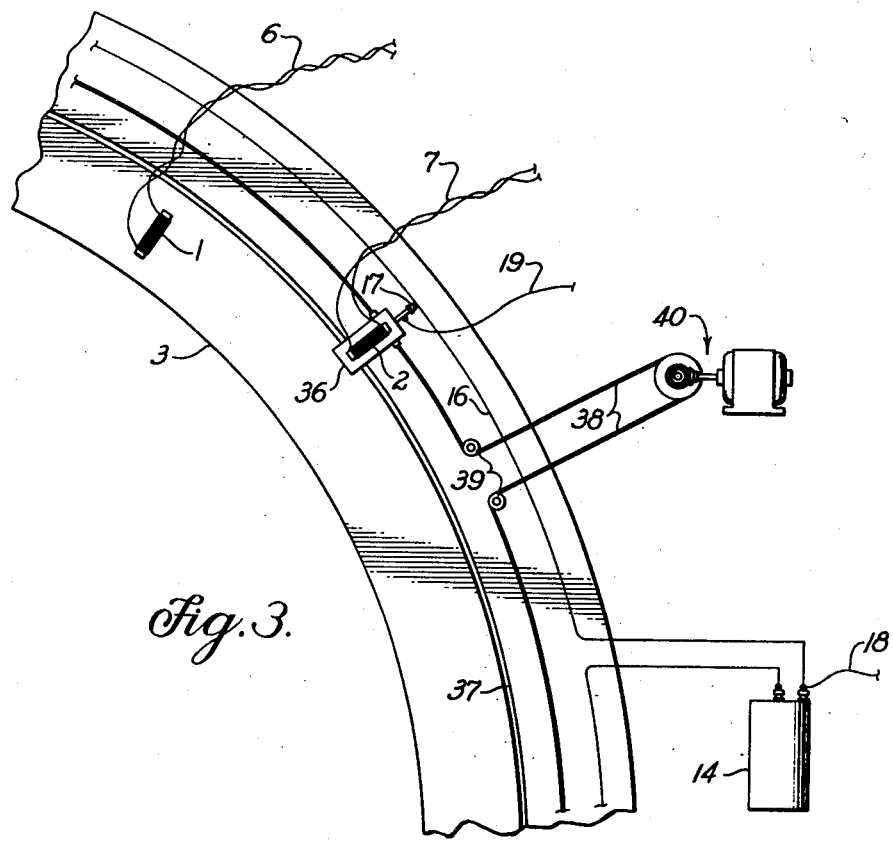
Fig. 3 is a diagrammatic representation of a portion of an embodiment of the invention adapted to determine the phase difference between the magnetic flux at a reference point and a plurality of points along a path about a toroidal magnet.
Figure 4:
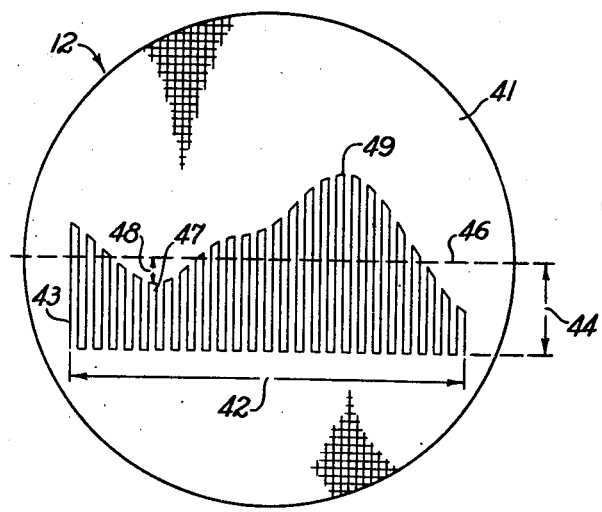
Fig. 4 represents a typical trace produced on the cathode ray tube screen of the invention.

The phase difference indicator in general comprises an electronic circuit, shown in Fig. 1, adapted to produce a plot, as shown in Fig. 4, of the phase difference between the magnetic flux at different points in a magnetic field and detected by peaking strips mounted as in Fig. 3 for example.

With reference to Fig. 1, it may be noted that two peaking strips 1 and 2 are disposed in a magnetic field contained in part within the boundary line 3. Peaking strips 1 and 2 are substantially identical in order that the response of each will be the same in like circumstances and they may conveniently comprise a coil 4 wound about a core 5 having a high magnetic permeability at low field strengths and low hysteresis loss, such as Permalloy, for example. The

2 above core characteristics are desirable for the reason that the molecules of the core thereby remain aligned during the portion of the magnetic cycle that the magnetic flux intensity is decreasing and rapidly realign upon reversal of the field, i. e., the magnetization of the core is substantially proportional to the magnetic flux intensity throughout the magnetic cycle.

Figure 2:
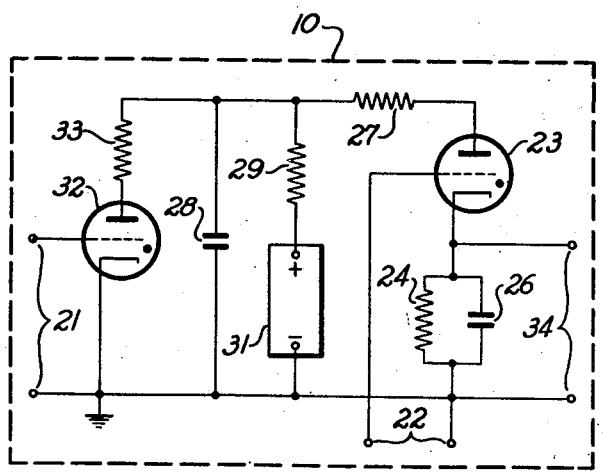
Fig. 2 is a simplified circuit arrangement of a time delay integrator suitable for use in the circuit of Fig. 1.

Peaking strips 1 and 2 are connected through conductors 6 and 7 to amplifiers 8 and 9, respectively, which may be of any conventional design capable of amplifying the signal from the peaking strips. Amplifiers 8 and 9 are both connected to input terminals of a time delay integrator 10 which produces a signal proportional to the time delay between the signals from peaking strips 1 and 2. A circuit suitable for the purposes of time delay integrator 10 is shown in Fig. 2 and described both as to construction and operation below. The output terminals of time delay integrator 10 are connected to the vertical deflection plates 11 of a cathode ray tube 12. The signal for the horizontal deflection plates 13 of cathode ray tube 12 is provided by a power supply, shown as battery 14, connected across a variable resistor 16 having a sliding contact 17. Horizontal deflection plates 13 are connected by means of conductors 18 and 19 between one end of the resistor 16 and the sliding contact 17 thereof, and the sliding contact 17 is connected to movable peaking strip 2 by mechanical linkages, shown only as a dotted line in Fig. 1 which may comprise means as shown in Fig. 3 and later described. Thus, the effective resistance of resistor 16 is varied in accordance with the movement of peaking strip 2 and a potential is impressed upon horizontal deflection plates 13 of cathode ray tube 12 which is proportional to the instantaneous position of peaking strip 2. The potential impressed upon vertical deflection plates 11 of cathode ray tube 12 is proportional to the time delay between the signals from peaking strips 1 and 2 and therefore there is traced on the screen of the cathode ray tube 12 a plot of the magnetic flux phase angle of a multitude of points along a predetermined path traversed by peaking strip 2, with reference to the magnetic flux at a fixed point in the magnetic field at which peaking strip 1 is located.

Considering the production of a voltage proportional to the time delay between two signals, reference is made to Fig. 2 wherein a circuit capable of producing such a voltage is illustrated. It will be noted that the amplified signal from stationary peaking strip 1 is applied to input terminals 21 of time delay integrator 10 and the amplified signal from movable peaking strip 2 is applied to another set of input terminals 22. Input terminals 22 are connected between ground and the control electrode of a gaseous electric discharge tube 23 which has its cathode grounded through a parallel resistance capacitance circuit comprising resistor 24 and capacitor 26. The anode of tube 23 is connected through resistor 27 to a grounded storage capacitor 28 and through resistor 27 and a resistor 29 to the positive terminal of a power supply 31 having its negative terminal grounded. Thus a signal from peaking strip 2 causes tube 23 to conduct and charge capacitor 26 at a rate determined by the R. C. constant of resistor 27 and capacitor 26. Input terminals 21 are connected between the control electrode of another gaseous electric discharge device 32 and the grounded cathode thereof. The anode of tube 32 is connected through current limiting resistor 33 to grounded storage capacitor 28 whereby a signal from peaking strip 1 causes tube 32 to conduct and rapidly discharge capacitor 28. Thus, in operation a signal from peaking strip 2 causes tube 23 to conduct and charge condenser 26. A signal from peaking strip 1 causes tube 32 to conduct and discharge capacitor 28 which thereby renders tube 23 non-conducting and halts the charging of capacitor 26. Tube 32 also de-ionizes upon discharge of capacitor 28. The output terminals 34 of time delay integrator 10 are connected across capacitor 26 and the output signal is thereby a function of the charge upon capacitor 26 and the discharge rate thereof, which rate is determined by the R. C. constant of resistor 24 and capacitor 26. The recharge rate of storage capacitor 28 is determined by resistance 29 which connects the positive terminal of power supply 31 thereto. From the foregoing it will be appreciated that the time during which output capacitor 26 is charging is determined by the time delay between the signals from peaking strips 1 and 2 and that therefore the magnitude of the output signal from time delay integrator 10 is a function of time delay or phase difference between signals from the peaking strips. It will of course also be appreciated that the output signal may be directly applied to the cathode ray tube or first fed into a holding stage, and also that, in the event that the input signals to time delay integrator 10 originate in only one circuit and it is desired to operate tube 32 from a second pulse, a gate circuit or a flip-flop circuit may be employed for this purpose.

It will be noted that the signal to tube 23 acts to initiate operation of the circuit and that it is thus necessary for the signal from peaking strip 2 to precede in time the signal from peaking strip 1. This is accomplished by biasing peaking strip 2 by any suitable means, such as a battery 15, which thereby hastens the alignment of the molecules in the Permalloy core 5 of peaking strip 2 during the half cycle of the magnetic field in which the peaking strips impress a positive signal on time delay integrator 10. This bias voltage produces the same result as a material phase lead and thus insures the signal from peaking strip 2 preceding in time the signal from peaking strip 1. The effect of this bias voltage on the cathode ray tube trace is discussed more fully below in connection with the explanation of Fig. 4 and the operation of the invention.

Considering the physical disposition of peaking strips 1 and 2 reference is made to Fig. 3 wherein one embodiment of this portion of the invention is depicted in conjunction with a toroidal alternating magnetic field. Stationary peaking strip 1 is shown disposed at a convenient location within a magnetic field contained by the boundary 3 and having conductors 6 extending therefrom outside of the magnetic field where they connect to amplifier 8 as noted above. Movable peaking strip 2 is mounted by any suitable means upon a carriage 36 which is adapted to traverse a predetermined path through the magnetic field as determined by cooperating guide member 37, such as a groove or rail, which is engaged by the carriage in movable relation thereto. A wire or string 38 is secured to both ends of carriage 36 and extends outside of the magnetic field area 3 where it may be power driven as by pulley and motor 40 or manually manipulated to produce motion of peaking strip 2. Strings 38 pass over pulleys 39 at the point where they abruptly change direction and may also pass over various other pulleys situated as required to insure motion of peaking strip carriage 36 along guide member 37. Variable resistance 16 may conveniently lie adjacent the path of movable peaking strip 2 whereby it is possible to attach the resistor sliding contact 17 directly to peaking strip carriage 36 and thus provide a simple means for varying the potential of the cathode ray tube horizontal deflecting plates in accordance with the motion of peaking strip 2. Fig. 3 also shows the connection of variable resistor 16 across a power supply such as battery 14 and the connection of wires 18 and 19, from the horizontal deflection plates, to the resistor sliding contact and one end of resistor 16, all as disclosed in Fig. 1 and described above in connection therewith. It will, of course, be appreciated that the particular elements and connections shown in Fig. 3 are in no wise limiting on the invention and numerous methods and means of moving peaking strip 2 and producing a potential which is a function of the movement of peaking strip 2 may be employed within the spirit and scope of the invention.

The elements of the invention having now been disclosed, the operation of the invention will be considered, and in this respect attention is invited to Fig. 4 as well as the figures previously considered. With an alternating or pulsating magnetic field existing within the boundaries 3, movable peaking strip 2 is propelled by means of wire 38 along a predetermined path as set by guide member 37. Each cycle of the magnetic field induces a potential signal in both stationary and movable peaking strips 1 and 2 and these signals are individually amplified by amplifiers 8 and 9 and applied to time delay integrator 10. The output from time delay integrator 10 is a voltage pulse having a magnitude proportional to the time difference between the positive signals from the peaking strips and this voltage is applied to the vertical deflecting plates 11 of cathode ray tube 12. Movement of peaking strip 2 causes sliding contact 17 to slide along resistor 16 and change the amount of resistance connected across battery 14 which is in turn connected to the horizontal deflection plates 13 of cathode ray tube 12. Movement of peaking strip 2 thereby produces a direct variation in the potential applied to horizontal deflection plates 13 and causes the trace on the screen of cathode ray tube 12 to be swept from one side to the other. As noted above, peaking strip 2 is biased by a battery 15 in order that the signal from peaking strip 2 will always lead the signal from peaking strip 1 and this has the effect of advancing the signal from peaking strip 2 as though the phase angle of the magnetic flux measured thereby were greater than it actually is. With this in mind an interpretation of the output of the invention may now be considered.

A typical plot of magnetic flux phase variation as produced by the present invention is shown in Fig. 4 which represents the screen 41 of cathode ray tube 12. The length 42 of the trace is of course proportional to the distance traveled by movable peaking strip 2, as explained above. The individual vertical pulses 43 each represent one cycle of the magnetic field and their heights are a function of the time delay between the signals produced by the two peaking strips 1 and 2; however, the heights of the individual pulses are not directly proportional to this time delay because of the bias voltage applied to peaking strip 2. As noted above the bias voltage operates to advance the indicated phase angle of the magnetic flux at the location of peaking strip 2 and as this advance is a constant amount it may be represented by the height 44 between the dotted line 46 and the base line of the trace on the screen. A variation of the height of the pulses from the height 44 is indicative of a phase difference between the magnetic flux at the location of peaking strip 1 and the magnetic flux at the instantaneous location of peaking strip 2, and the distance between the pulse height and the bias line 46 is a measure of the magnitude of this phase difference. Also the direction in which the pulse tip is displaced from bias line 46 determines whether the magnetic flux at peaking strip 2 is leading or lagging the magnetic flux at peaking strip 1. Thus, for example, at a point 47 on the trace, which corresponds to an exact determinable position of peaking strip 2 in the magnetic field, the magnetic flux at peaking strip 2 lags the magnetic flux at the location of peaking strip 1 by an amount 48 which may be measured by the distance between the pulse height and the bias line height 44. In like manner the magnetic flux at a point in the magnetic field corresponding to the pulse 49 on the trace has a phase angle greater than the magnetic flux at the stationary point where peaking strip 1 is located, and this phase lead is proportional to the distance between the pulse tip and the bias line 46.

It will, of course, be appreciated that the bias line 46 may be made available at the screen for comparison purposes either by physically marking it on the screen cover or by electronic means whereby a line is continuously traced on the screen itself.

A further consideration in the operation of the invention and the interpretation of the plot obtained thereby is the frequency of the magnetic field and consequent variations in operation necessitated thereby. As may be noted from Fig. 4 it is advantageous for the magnetic field to complete a multitude of cycles in the time required for movable peaking strip 2 to traverse its predetermined path in order that the individual vertical pulses on the screen will each represent a point in the field rather than some appreciable distance. This is accomplished by controlling the speed with which movable peaking strip 2 traverses its predetermined path. If, however, the time required for peaking strip 2 to complete its traverse is large, and the corresponding horizontal sweep time of the cathode ray tube is large, the first portion of the trace would disappear before the trace is completed. Thus, in usual circumstances a compromise may be reached and, by appropriate choice of the speed with which peaking strip 2 is moved, the width of the individual pulses on the screen may be minimized to the greatest extent possible consistent with the requirement for a relatively fast horizontal sweep. In the event, however, that the magnetic field to be measured has a very long cycle a transparent cover may be placed over the screen 41 and the locus of the pulse peaks marked thereon to produce a permanent record of the important portion of the trace from which the required data may be conveniently obtained.

While the present invention has been disclosed with respect to a single embodiment, it will be apparent to those skilled in the art that numerous modifications and variations are possible within the spirit and scope of the invention and thus the invention is not to be limited except as defined in the following claims.

What is claimed is:

1. A magnetic flux phase indicator comprising a stationary peaking strip and a movable peaking strip disposed in an alternating magnetic field, a time delay integrator having an input circuit connected to said peaking strips and producing a voltage proportional to the time delay between input signals from said peaking strips, a cathode ray tube having horizontal and vertical electron beam deflecting means, means connecting the output of said time delay integrator to said vertical deflecting means, potential supply means having a control element responsive to the position of said movable peaking strip, and means connecting said potential supply means to said horizontal deflecting means.

2. A magnetic flux phase indicator comprising a pair of core wound induction coils disposed in a varying magnetic field, whereby a voltage is induced in said coils, a time delay integrator comprising means to produce a signal proportional to the time delay between a pair of input voltages, connecting means impressing the voltages induced in said induction coils upon said time delay integrator, a cathode ray tube having a fluorescent screen and horizontal and vertical electron beam deflection means, means impressing the signal from said time delay integrator upon said vertical deflection means, means for moving one of said induction coils along a predetermined path within said magnetic field, a power source connected to said horizontal deflection means, a variable resistor connected between said power source and said horizontal deflection means and having a movable contact thereon, mechanical linkage joined to said moving induction coil and to said movable resistor contact for varying the resistance of said resistor and the potential impressed upon said horizontal deflection means in accordance with the motion of said induction coil, whereby a trace of the magnetic flux phase difference between the instantaneous points of location of said coils in said magnetic field is produced on said screen.

3. A magnetic flux phase indicator comprising a stationary and a movable peak strip disposed in an alternating magnetic field whereby potentials are induced therein, propelling means for moving said movable peaking strip within said magnetic field, means engaging said movable peaking strip and directing the motion thereof along a predetermined path, a time delay integrator circuit having a pair of input circuits connected one to each of said peaking strips and an output circuit producing a voltage proportional to the time delay between the two input voltages, a potential supply source having control means, said control means being responsive to the position of said movable peaking strip, and indicating means connected to said time delay integrator output circuit and said potential supply source for indicating the magnetic flux phase difference between the instantaneous points of location of said peaking strips in said magnetic field.

4. A magnetic flux phase indicator comprising a first peaking strip mounted in a fixed position in a magnetic field, a second peaking strip mounted upon a movable carriage, driving means engaging said carriage for moving said carriage within said magnetic field, a guide member lying on a predetermined path in said magnetic field and engaging said carriage whereby said carriage is constrained to traverse said predetermined path in said magnetic field under the influence of said driving means, a time delay integrator circuit having an input circuit connected to said first and second peaking strips and producing a voltage proportional to the time delay between input signals, a cathode ray tube having horizontal and vertical deflection means, connecting means impressing the output of said time delay integrator circuit upon said vertical deflection means, a potential supply source having control means responsive to the instantaneous position of said second peaking strip, and means connecting said potential supply source to said horizontal deflection means.

5. A magnetic flux phase indicator as defined in claim 4 further characterized by said potential supply source control member comprising a variable resistor having a sliding contact and being disposed adjacent the predetermined path of said second peaking strip, said sliding contact being fixed to the carriage of said second peaking strip and contacting the resistance portion of said resistor whereby the effective resistance of said resistor is determined by the position of said second peaking strip.

6. A magnetic flux phase indicator comprising a cathode ray tube having a fluorescent screen and horizontal and vertical electron beam deflection means, a pair of peaking strips within an alternating magnetic field and comprising coil wound Permalloy cores, one of said coils being adapted for movement along a predetermined path within said magnetic field and the other coil being disposed at a fixed point in said magnetic field, propelling means for moving said movable peaking strip along a predetermined path in said magnetic field, potential supply means producing a potential proportional to the displacement of said moving peaking strip from a fixed point and connected to the horizontal deflection means of said cathode ray tube whereby a trace is produced on the screen of said cathode ray tube, and means producing a potential proportional to the time delay between signals from said peaking strips and impressing said potential upon the vertical deflection means of said cathode ray tube whereby the height of the trace on the screen of said cathode ray tube is proportional to the phase difference between the magnetic flux at the location of the fixed peaking strip and the instantaneous position of the movable peaking strip as measured by the horizontal component of the trace.

WILSON M. POWELL.

REFERENCES CITED

The following references are of record in the file of this patent:

UNITED STATES PATENTS

| Number | Name | Date |
| --- | --- | --- |
| 2,124,825 | Machts et al. | July 26, 1938 |
| 2,388,683 | Frickey et al. | Nov. 13, 1945 |
| 2,506,433 | Plesset | May 2, 1950 |